US005931575A

United States Patent [19]

Yamamoto et al.

[11] Patent Number: 5,931,575
[45] Date of Patent: Aug. 3, 1999

[54] VEHICLE LAMP REFLECTING MIRROR AND A METHOD OF MANUFACTURING THE SAME

[75] Inventors: Norimasa Yamamoto; Norihiro Nishitani; Yoshiaki Furuya, all of Shizuoka, Japan

[73] Assignee: Koito Manufacturing Co., Ltd., Tokyo, Japan

[21] Appl. No.: 08/762,818

[22] Filed: Dec. 9, 1996

[30] Foreign Application Priority Data

Jan. 10, 1996 [JP] Japan .................................... 8-18192

[51] Int. Cl.[6] .................................................. B60Q 1/04

[52] U.S. Cl. ......................... 362/518; 362/459; 362/487; 362/215; 362/297

[58] Field of Search .................................. 362/517, 459, 362/487, 215, 297, 518, 519

[56] References Cited

U.S. PATENT DOCUMENTS

| | | | |
|---|---|---|---|
| 4,959,757 | 9/1990 | Nakata | 362/517 |
| 5,532,909 | 7/1996 | Ban et al. | 362/61 |
| 5,727,874 | 3/1998 | Yamamoto | 362/517 |
| 5,777,809 | 7/1998 | Yamamoto | 362/517 |

*Primary Examiner*—Sandra O'Shea
*Assistant Examiner*—Marshall Honeyman
*Attorney, Agent, or Firm*—Sughrue, Mion, Zinn, Macpeak & Seas, PLLC

[57] ABSTRACT

A light emitting reference point is set for a light source attached to a reflecting mirror having an opening on one end thereof, and it is assumed that a point light source is set on the reference point. Then, a reference surface formed as a set of half lines extending from the reference point to an arbitrary point on a front end edge of a socket arranged so as to interrupt rays of light from the point light source. Then, a partial surface of the basic surface of a reflective surface around the socket is arranged so that the partial surface projects more frontward than the reference surface, and a curved form of the partial surface is arranged so that the rays of light emitted from the point reach everywhere on the surface. Then, a group of paraboloids of revolution formed by a number of paraboloids of revolution whose focal distances are different from one another, is prepared, and intersecting lines between the basic surface and the group of paraboloids of revolution are obtained. Finally, a number of reflecting steps are formed on the basic surface between adjacent ones of the intersecting lines. The reflecting steps are defined by parts of the individual paraboloids of revolution.

10 Claims, 11 Drawing Sheets

VEHICLE LAMP REFLECTING MIRROR AND A METHOD OF MANUFACTURING THE SAME

BACKGROUND OF THE INVENTION

The present invention relates to a reflecting mirror for a vehicle lamp that can improve reflecting efficiency and reduce an area ineffective in forming light distribution by eliminating an area, which is shaded from rays of light emitted from a light source, on a reflective surface of the reflecting mirror, as well as to a method of manufacturing such a reflecting mirror.

One basic construction of a vehicle lamp is as follows. The vehicle lamp includes a lamp body having an opening at one end thereof; a reflecting mirror arranged within the lamp body or a reflecting portion formed by applying a reflection treatment to a part of the lamp body; and an outer lens that covers the opening of the lamp body. The reflective surface of the reflecting mirror or the reflecting portion is formed by a paraboloid of revolution or the like, which is symmetrical around the optical axis of the lamp.

FIG. 12 shows a positional relationship between a reflecting mirror "a" having the shape of a paraboloid of revolution and a lamp bulb "b". The lamp bulb "b" is attached to the reflecting mirror "a" with the central axis K—K of the lamp bulb "b" extending along the optical axis of the reflecting mirror "a".

A glass bulb "c" of the lamp bulb "b" has an end portion on the reflecting mirror side accommodated in a socket "d", and power is supplied to a filament "e" inside the glass bulb "c" from a power supply (not shown).

In the thus constructed reflecting mirror "a", rays of light from the lamp bulb "b" is shaded with a socket "d" that supports the bulb "c". As a result, the reflective surface of the reflecting mirror "a" has an area onto which the rays of light are not incident.

Specifically, in FIG. 12, out of rays of light "f", "f", . . . emitted from light emitting reference point F of the filament e, part of such rays of light advancing toward the reflective surface of the reflecting mirror "a" are shaded by the socket "d". As a result, the rays of light are not incident onto the area within such a range as indicated by DA in FIG. 12, thus leaving the area ineffective in manufacturing luminous intensity distribution.

SUMMARY OF THE INVENTION

To overcome the above problem, the present invention has an object to reduce a nonreflecting area in a reflective surface. That is, the invention improves the designing of the shape of the reflective surface so that rays of light from a light source can reach somewhere on the reflective surface even if there is a member such as a socket that shades the reflective surface of the reflecting mirror from the rays of light emitted from the light source.

To achieve the above object, the invention is applied to a reflecting mirror for a vehicle lamp in which a light emitting reference point is set with respect to a light source being arranged so as to have a predetermined positional relationship with respect to the reflecting mirror having an opening at a front end thereof; and if it is assumed that a point light source is arranged at the light emitting reference point, a member or a part of the reflecting mirror being arranged at such a position as to interrupt rays of light emitted from the light emitting reference point is positioned more rearward than the light emitting reference point, the reflecting mirror being formed by: first setting a reference surface formed as a set of linear half lines extending from the light emitting reference point of the light source as a starting point through an arbitrary point on a front end edge of the member or part of the reflecting mirror; setting a surface of an area around the member or the part of the reflecting mirror in a basic surface of a reflective surface of the reflecting mirror so that the surface projects more frontward than the reference surface; arranging a curved shape of the surface so that rays of light emitted from the light emitting reference point reach some point on the surface; preparing a group of paraboloids of revolution formed of a number of paraboloids of revolution whose focal distances are different from one another; obtaining intersecting lines between the basic surface and the group of paraboloids of revolution; and forming a number of reflecting steps on the basic surface of the reflective surface between adjacent ones of the intersecting lines, the steps being defined by parts of the individual paraboloids of revolution.

Therefore, according to the invention, rays of light emitted from the light emitting reference point reach somewhere on the basic surface of the reflective surface, and the reflecting steps defined by parts of the paraboloids of revolution are formed. Therefore, rays of light whose reflecting direction is controlled, can be obtained and utilized as effective light in manufacturing luminous intensity distribution.

DETAILED DESCRIPTION OF THE INVENTION

A reflecting mirror for a vehicle lamp of the invention and a method of manufacturing such a reflecting mirror will now be described.

Figure 1:
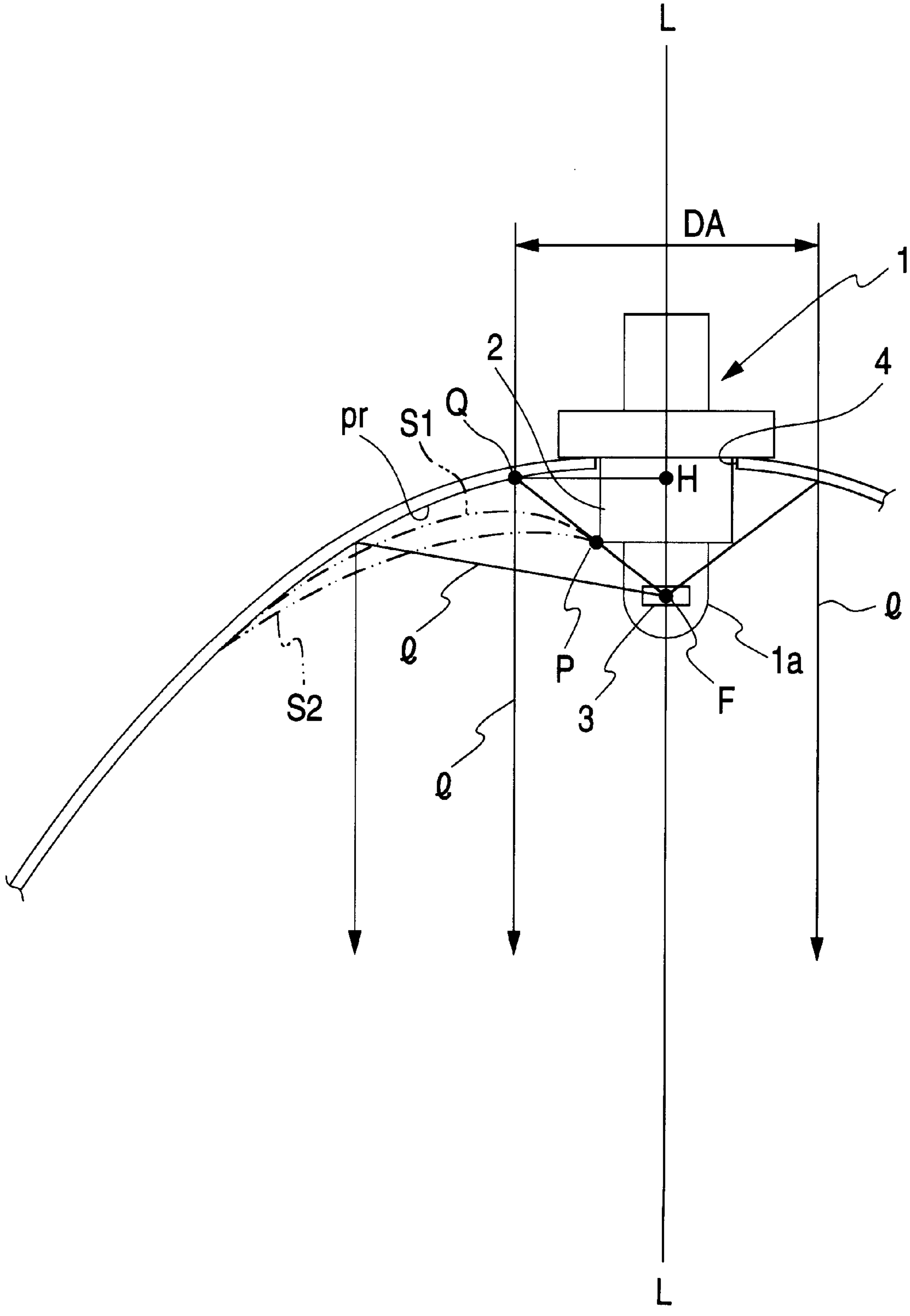
FIG. 1 is a horizontal sectional view schematically showing a main portion for explaining the formation of a basic surface of a reflective surface of the invention together with FIGS. 2 to 6.

FIG. 1 shows a positional relationship between a reflective surface of the reflecting mirror and a lamp bulb. A surface "pr" indicated by a solid line shows the reflective surface of a paraboloid of revolution.

In FIG. 1, a lamp bulb 1 is used as a light source, and is attached to a reflecting mirror while one end of a glass bulb 1*a* of the lamp bulb is inserted into a socket 2. A light emitting reference point F of a filament 3 within the glass bulb 1*a* is arranged on an optical axis (L—L) of the reflecting mirror. The lamp bulb 1 is positioned within the reflecting mirror through an insertion hole 4 which is formed in the reflecting mirror, and the filament 3 is arranged so that a central axis thereof intersects the optical axis L—L orthogonally so as to extend in a vertical or horizontal direction, or the central axis of the filament 3 extends along the optical axis L—L. It is needless to say that the light source of the reflecting mirror of the invention is not limited to a lamp bulb, but a discharge lamp or the like can be used as well.

Let us now consider a line segment FP that passes from the light emitting reference point F to a point P on a front edge (the front being defined as a direction moving away from the reflective surface along the optical axis L—L) of the socket 2, and let it be assumed that an intersecting point Q is arranged as a point at which an extension obtained by extending the line segment FP toward the reflective surface pr intersects the reflective surface pr. Then, if the foot of a perpendicular on the optical axis L—L from the point Q is assumed to be H, an area within a range DA of the length of a line segment QH from the optical axis L—L is obviously shaded from rays of light l, l, . . . emitted from the lamp bulb 1. More correctly, it is an area positioned inside an intersecting line between a curved surface and the reflective surface pr that is the area indicated by the range DA, the curved surface being obtained by rotating the line segment FQ as a generatrix around the optical axis L—L (e.g., if the socket 2 is cylindrical, the curved surface is a conical surface having the point F as a vertex).

In order to eliminate such an area, the reflective surface of the invention is designed in the following manner. The curved surface portion close to the optical axis L—L is caused to project frontward with respect to the line segment FQ as indicated by one dot chain line S1 or two dot chain line S2 in FIG. 1, and such a curved surface portion is arranged so that rays of light from the lamp bulb 1 can be incident everywhere on such a curved surface portion. Such a curved surface portion is utilized as a basic surface of the reflective surface.

That is, the reflective surface is prepared first by forming the curved surface so that a part of the curved surface, i.e., a basic surface, is not shaded from the rays of light emitted from the light source and then by arranging a great number of reflecting steps on the basic surface in accordance with a procedure, which will be described later.

Methods such as shown in FIGS. 2 to 6 can be employed to form the aforementioned basic surface.

Figure 2:
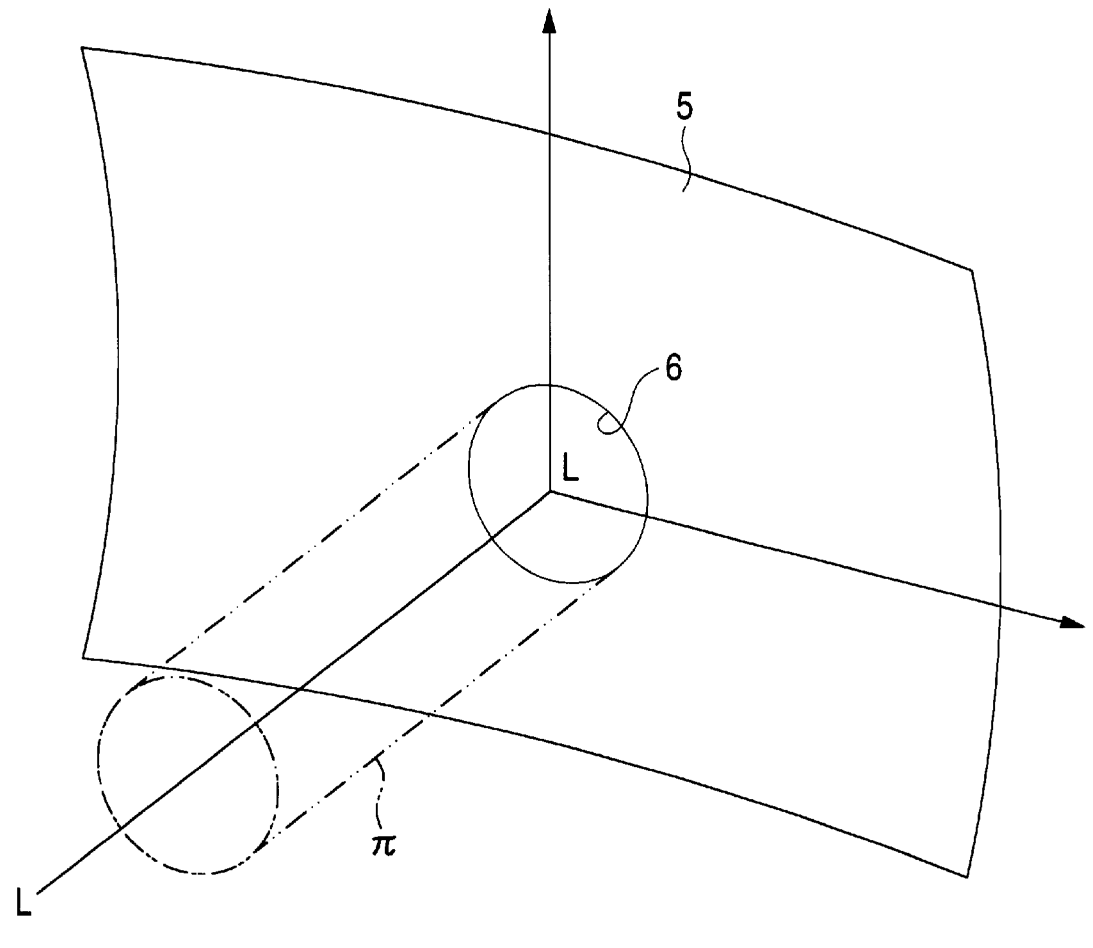
FIG. 2 is a perspective view showing an original curved surface and an insertion hole of a light source to be formed in the original curved surface.

First, as shown in FIG. 2, a reference curved surface 5 (hereinafter referred to as the "original surface") is prepared. An insertion hole 6 of the lamp bulb 1 is formed in the original surface 5. Then, a locus π to be obtained when the insertion hole 6 is moved in parallel with the optical axis L—L of the reflecting mirror is depicted. For example, if the insertion hole 6 is circular, the locus π thereof becomes cylindrical.

While the original curved surface 5 may be a known curved surface (such as a paraboloid of revolution), the original curved surface is generally prepared as a free curved surface (such a curved surface as cannot be expressed or is hard to be expressed analytically) on a CAD (Computer Aided Design).

Figure 3:
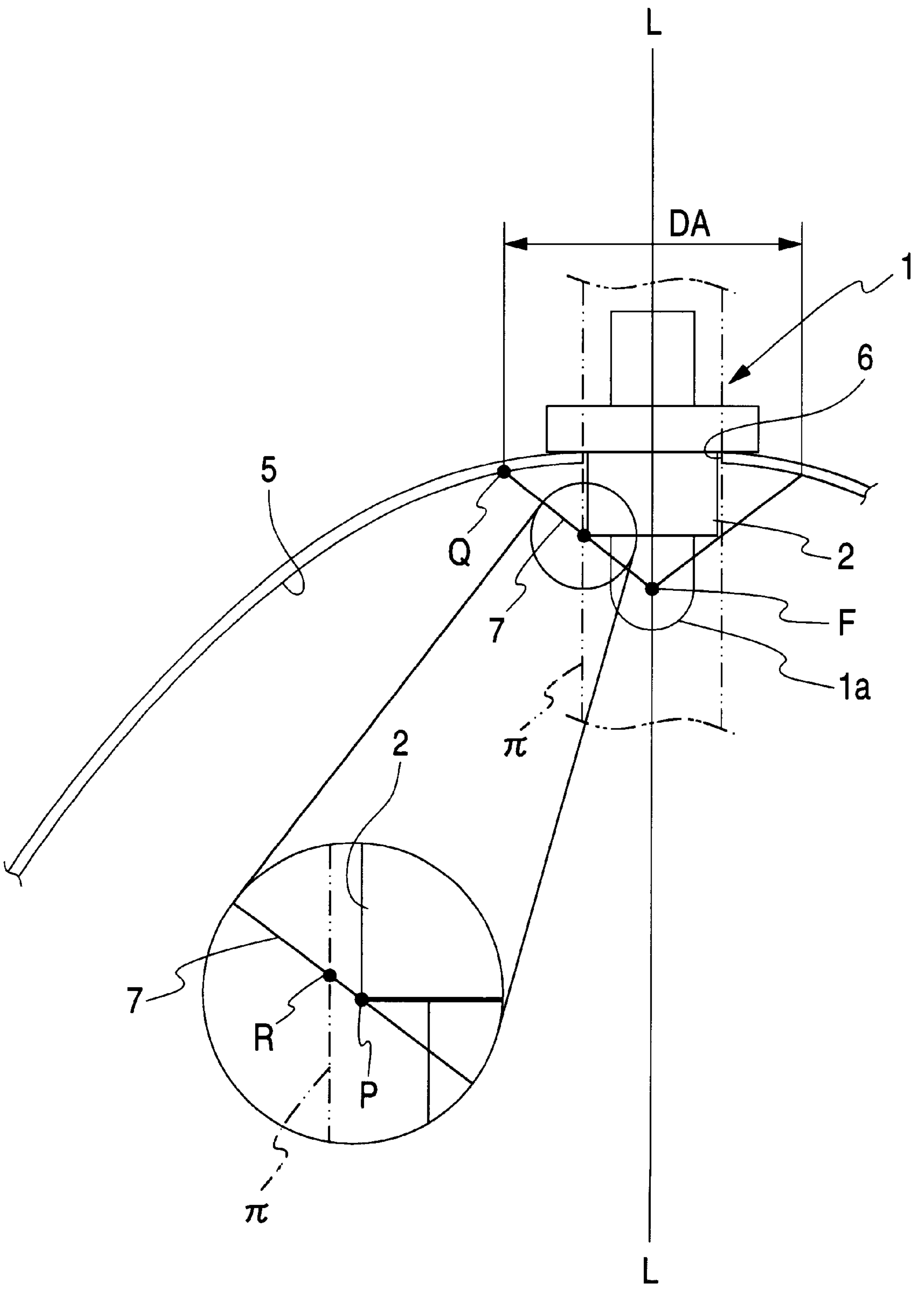
FIG. 3 is a diagram illustrative of a dead angle defining surface.

Then, as shown in FIG. 3, the lamp bulb 1 and the socket 2 are arranged on the optical axis L—L through the insertion hole 6, and a reference surface 7 (hereinafter referred to as "dead angle defining surface", this surface being indicated in FIG. 3 as a half line that passes through the point F and the point Q on a line along which the surface 7 intersects the reflecting surface) is set. That is, the reference surface 7, or the dead angle defining surface 7 is formed as a set of half lines that pass through the point P on the front edge of the socket 2 and extend from the light emitting reference point F. As a result, an intersecting line along which the dead angle defining surface 7 intersects the locus π can be obtained. In FIG. 3, a point on the intersecting line is indicated as a point R inside a large circle. Also, in FIG. 3, the locus π is indicated as a straight line that extends in parallel with the optical axis-L—L.

Figure 4:
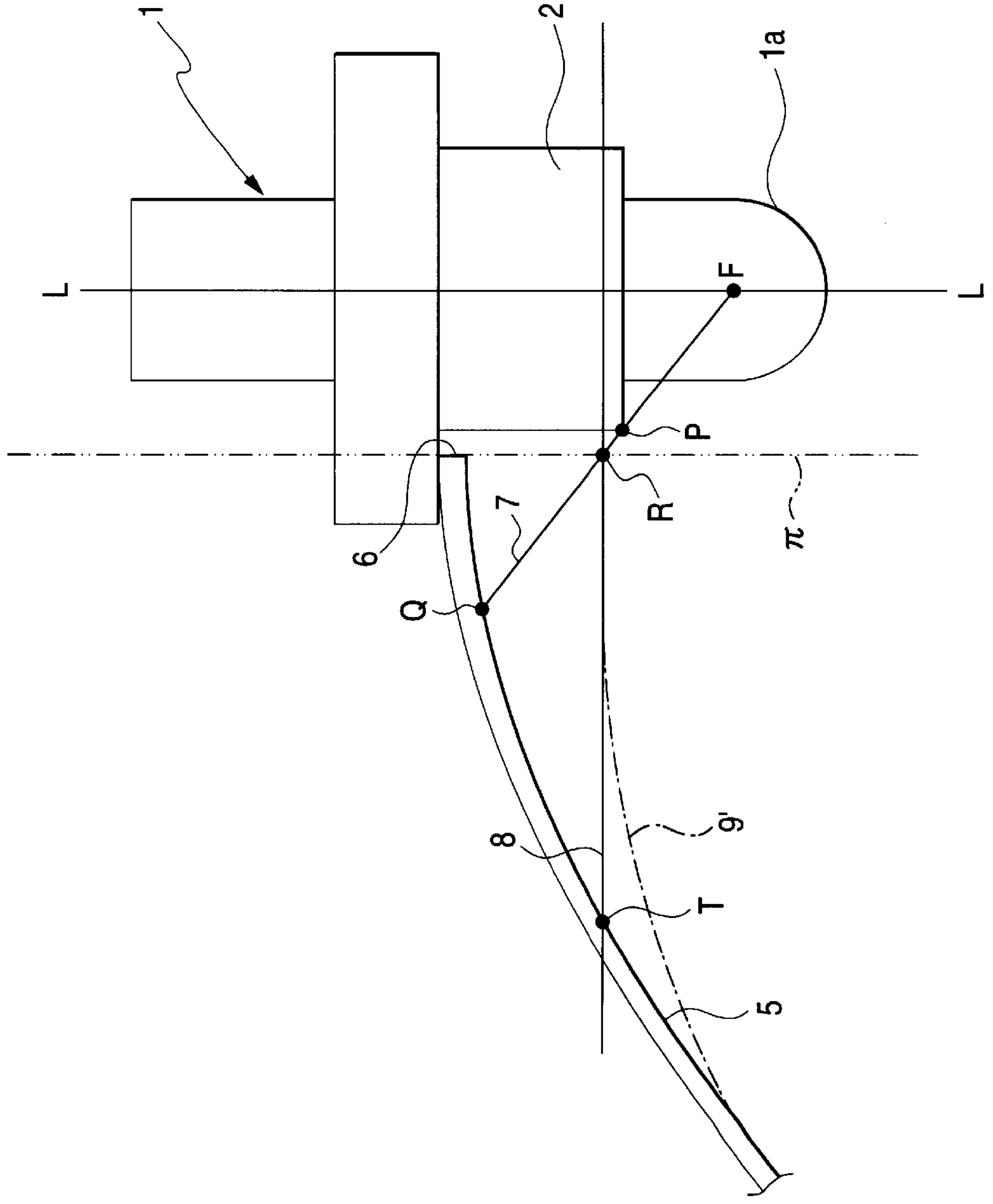
FIG. 4 is a diagram showing a plane orthogonal to an optical axis L—L and a basic surface obtained by smoothly connecting the plane to the original curved surface.

Then, as shown in FIG. 4, a plane 8, which includes the intersecting line between the dead angle defining surface 7 and the locus π and orthogonally intersects the optical axis L—L, is set.

However, if the original curved surface 5 is connected to the plane 8 as they are, there is no guarantee that both surfaces are connected to each other smoothly along the borderline (indicated by point T in FIG. 4). Therefore, in the process of forming the basic surface 9, it is preferred that the original curved surface 5 is connected to the plane 8 through a curved surface or the like having a predetermined radius of curvature as indicated by the one dot chain line in FIG. 4 so that both surfaces can be connected as smoothly as possible. That is, it is desirable, in general, that both surfaces are connected in the form of an nth order continuum (i.e., continuum and regularity is established on a connecting point with a derivative of the nth order), where $n \geqq 1$.

Hence, when the basic surface 9 that is formed by the original curved surface 5 and the plane 8 is viewed from the front, no portion in the middle of the basic surface is shaded from the rays of light emitted from the point F. That is, the portion of the plane 8 which contributes to forming the basic surface 9 is not shaded from the rays of light emitted from the point F.

Figure 5:
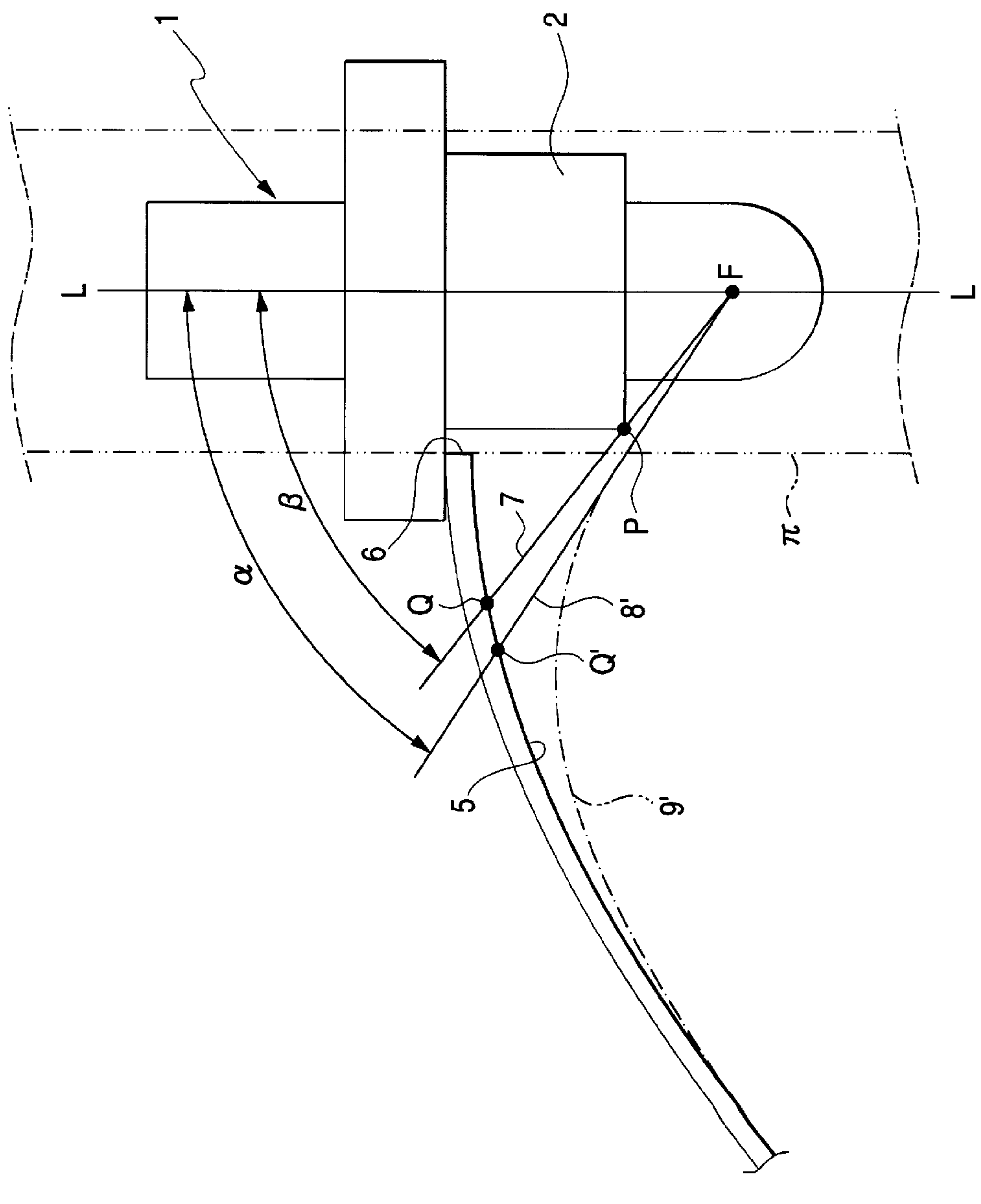
FIG. 5 is a diagram showing a surface whose angle of inclination with respect to the optical axis L—L is made larger than that of the dead angle defining surface and a basic surface obtained by smoothly connecting such a surface to the original curved surface.
Figure 6:
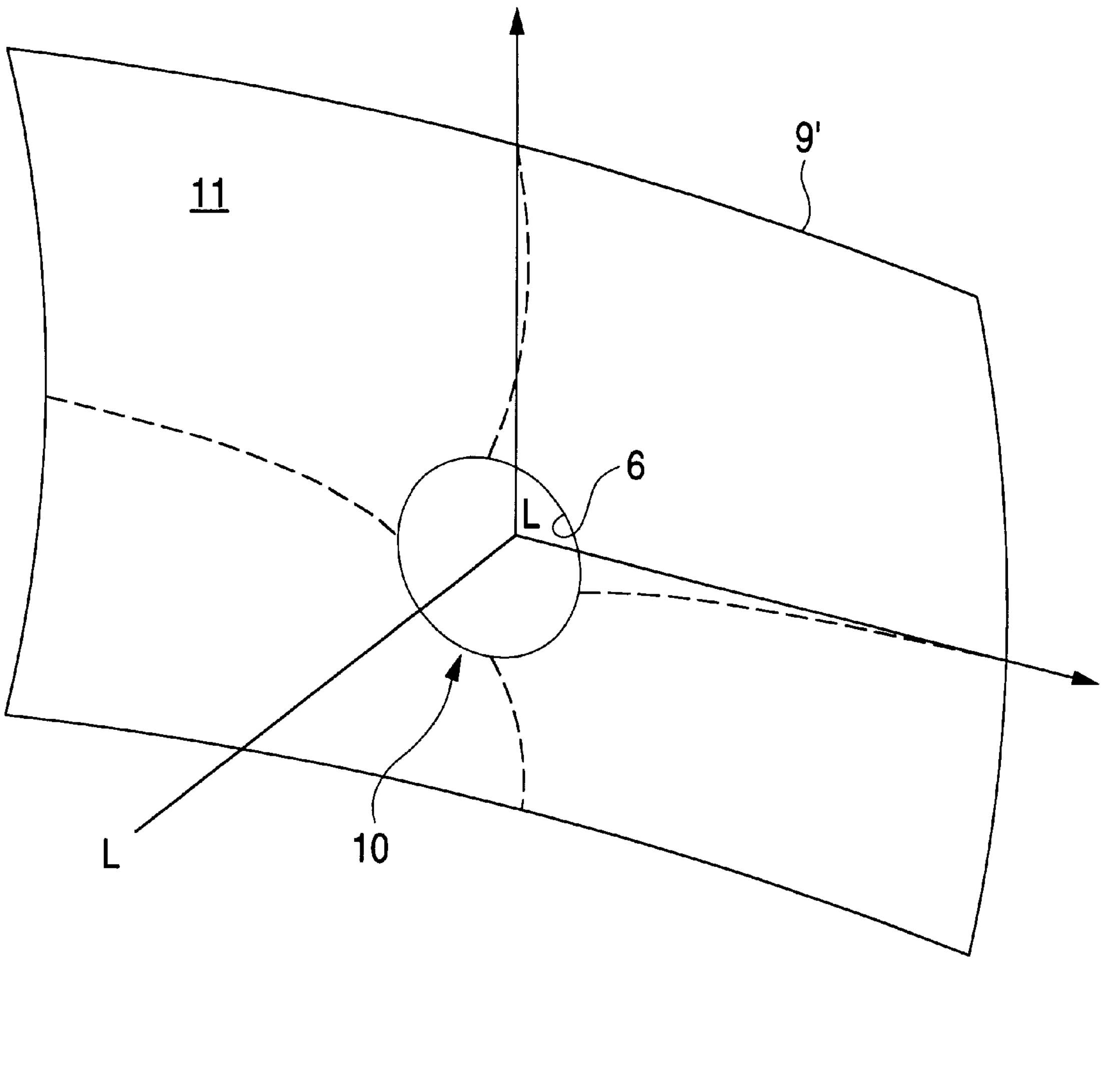
FIG. 6 is a perspective view schematically showing the basic surface of FIG. 5.

Instead of arranging the plane 8 that extends orthogonally to the optical axis L—L in FIG. 4 as described above, a basic surface 9' may be formed by connecting a surface 8' that is inclined with respect to the optical axis L—L to the reflective surface 5 smoothly as shown in FIGS. 5 and 6.

That is, as shown in FIG. 5, first, the surface 8' is set (the surface 8' is indicated by line segment FQ' in FIG. 5, where point Q' is a point on an intersecting line between the surface 8' and the original curved surface 5). The surface 8' is inclined with respect to the optical axis L—L so that an angle of inclination α with respect to the optical axis L—L becomes larger than an angle of inclination β, with respect to the optical axis L—L, of the dead angle defining surface 7 indicated as the half line FQ. Then, the surface 8' is connected to the original curved surface 5 smoothly as indicated by the one dot chain line in FIG. 5. As a result, the basic surface 9' can be obtained as shown in FIG. 6. That is, the thus obtained basic surface 9' is characterize in that a portion 10 around the insertion hole 6 of the lamp bulb 1 is protuberant toward the front compared with the other portion 11. For forming such frontward protuberant portion 10 at the time of molding the reflecting mirror, the wall thickness of the portion 10 may be increased, reinforcing ribs may be arranged, or other like techniques may be employed.

In short, if the basic surface is formed by preparing such a surface as the plane 8 or 8' that is positioned more frontward than the dead angle defining surface 7 and connecting such a surface to the original curved surface 5, then a curved surface can be designed so that the curved surface has no portion that is shaded from the rays of light emitted from the lamp bulb 1.

However, what has been achieved at this stage in the process of preparing the reflecting mirror is not more than a condition in which the basic surface 9 or 9' can receive rays of light from the lamp bulb 1. It should be noted that the basic surface 9 or 9' cannot yet transform the rays of light into controlled reflected light nor can the surface 9 or 9' provide rays of reflected light effective in forming luminous intensity distribution.

Figure 7:
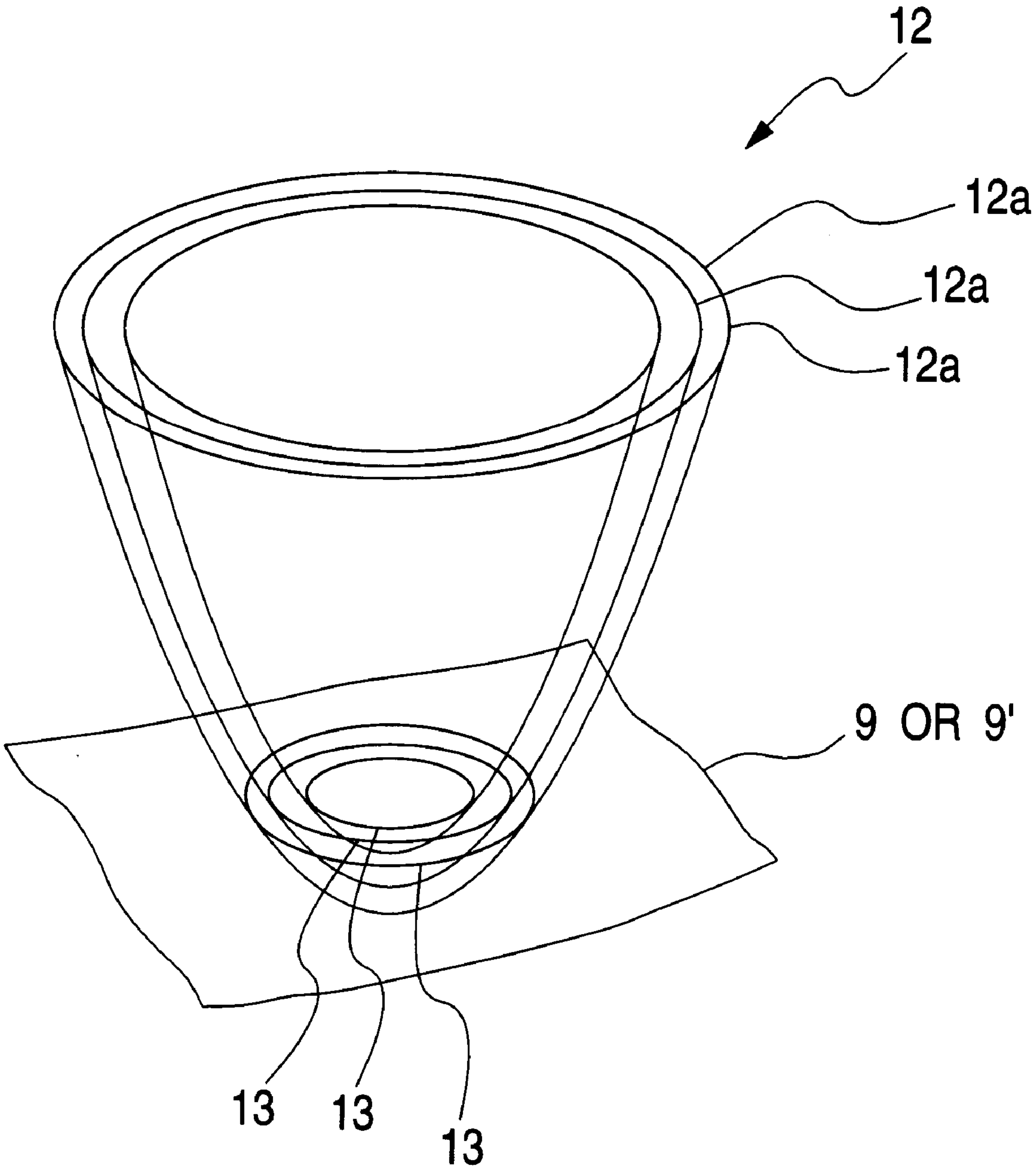
FIG. 7 is a diagram illustrative of the formation of reflecting steps on a basic surface together with FIGS. 8 and 9, showing a group of paraboloids of revolution, the basic surface, and a group of closed curved lines obtained as intersecting lines between the group of paraboloids of revolution and the basic surface.
Figure 8:
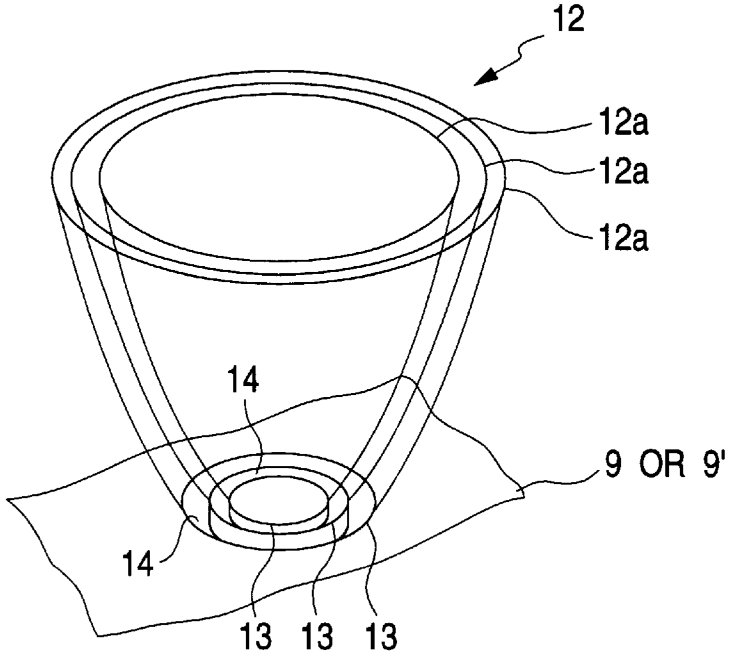
FIG. 8 is a diagram illustrative of the formation of the reflecting steps.
Figure 9:
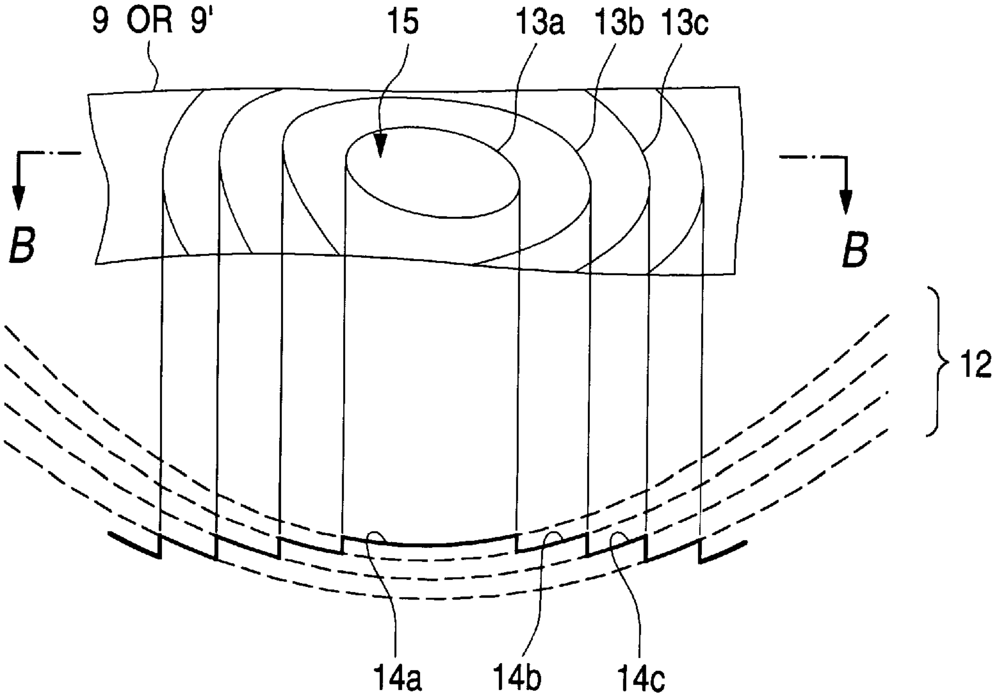
FIG. 9 is a diagram showing the shape of a part of the reflective surface and a cross section thereof.

For improving the basic surface so that the object of the invention can be achieved, a number of reflecting steps are formed in accordance with a procedure shown in FIGS. 7 to 9. These reflecting steps are defined by borderlines that are looplike or that form parts of loops.

As shown in FIG. 7, a group of paraboloids of revolution 12 that defines the performance of the reflective surface is prepared. The group of paraboloids of revolution 12 includes a number of paraboloids of revolution 12*a*, 12*a*, . . . that have a common axis of symmetry of revolution and whose focal distances are different from one another. These paraboloids of revolution 12*a*, 12*a*, . . . are so selected as not to intersect one another spacewise. It should be noted that the focuses of the paraboloids of revolution 12*a*, 12*a*, . . . do not always coincide with one another (e.g., the case that the respective focuses are positioned within a certain range along the axis of symmetry of revolution is acceptable since an actual light source has a certain size).

Then, intersecting lines 13, 13, . . . between the basic surface 9 or 9' and the group of paraboloids of revolution 12 are determined. These intersecting lines 13, 13, . . . form closed curved lines or parts of such closed curved lines and never intersect one another on the curved surface. It may be noted that the central portion of the group of closed curved lines is generally located off an intersecting point between the optical axis of the reflecting mirror and the curved surface, because the central portion of the group of closed curved lines is determined by the position of a point at which one paraboloid of revolution constituting the group of paraboloids of revolution comes into contact with the curved surface if the intersecting lines 13, 13, . . . include the closed curved lines.

When the intersecting lines 13, 13, . . . have been determined in this way, the reflecting steps are then formed based on these intersecting lines. That is, as shown in FIG. 8, the reflecting steps 14, 14, . . . defined by parts of the paraboloids of revolution are formed between the adjacent intersecting lines.

FIG. 9 shows a part of the basic surface in the upper part thereof, and schematically shows a section taken along line B—B of the basic surface in the lower part thereof. The intersecting lines on the basic surface 9 or 9' are denoted by 13*a*, 13*b*, 13*c*, . . . from the position closer to the central portion 15 of the group of closed curved lines, and appear as borderlines between the reflecting steps. The broken lines in FIG. 9 show the group of paraboloids of revolution. The steps are formed in such a manner that a reflecting step 14*a* is formed in an inner region defined by the intersecting line 13*a*, that a reflecting step 14*b* is formed in an inner region between the intersecting lines 13*a* and 13*b*, and that a reflecting step 14*c* is formed in an inner region between the intersecting lines 13*b* and 13*c*. In other words, the effective reflective surfaces of the individual reflecting steps are formed so as to be parts of paraboloids of revolution whose focal distances are different from one another. Such effective reflective surfaces are shaped steplike when viewed in cross-sectional form.

Once a reflective surface having the thus arranged reflecting steps and a reflecting mirror 1 having the reflective surface have been prepared using the CAD system, CAM (Computer Aided Manufacturing) data can be obtained in order to prepare a mold for the reflecting mirror 1 based on the reflective surface and reflecting mirror data.

According to the reflecting mirror having the aforementioned reflective surface, rays of light whose reflecting directions are controlled by the many reflecting steps formed on the reflective surface, can be utilized as rays of light effective for luminous intensity distribution (e.g., if the focuses of the group of paraboloids of revolution are assumed to be common and if a point light source is assumed to be placed on the common focus, rays of light emitted from the point light source and reflected by arbitrary reflecting steps become parallel rays of light with respect to the common axis of the group of paraboloids of revolution). Therefore, no portion in the reflective surface is shaded by the presence of the socket 2 of the lamp bulb 1.

While the socket 2 of the lamp bulb 1 has been exemplified as a member for interrupting light emitted from the light source toward the reflective surf ace of the reflecting mirror in the aforementioned description, the light interrupting member is not limited to the socket. The light interrupting member may include: mounting bosses, mounting ridgelike projections, and the like formed on the reflecting mirror (e.g., mounting bosses for the shades of headlights, mounting bosses for cap members such as yellow lenses that enclose lamp bulbs in fog lamps, turn signal lamps, and the like); mounting portions formed on the reflecting mirror for mounting and supporting a light source; and in the case where the reflective surface is formed by applying a reflection treatment to the inner surface of a lamp body that constitutes a lamp, stepped portions present on the reflective surface side due to the influence of mounting portions formed on the lamp body for mounting the lamp body onto an automobile.

Figure 10:
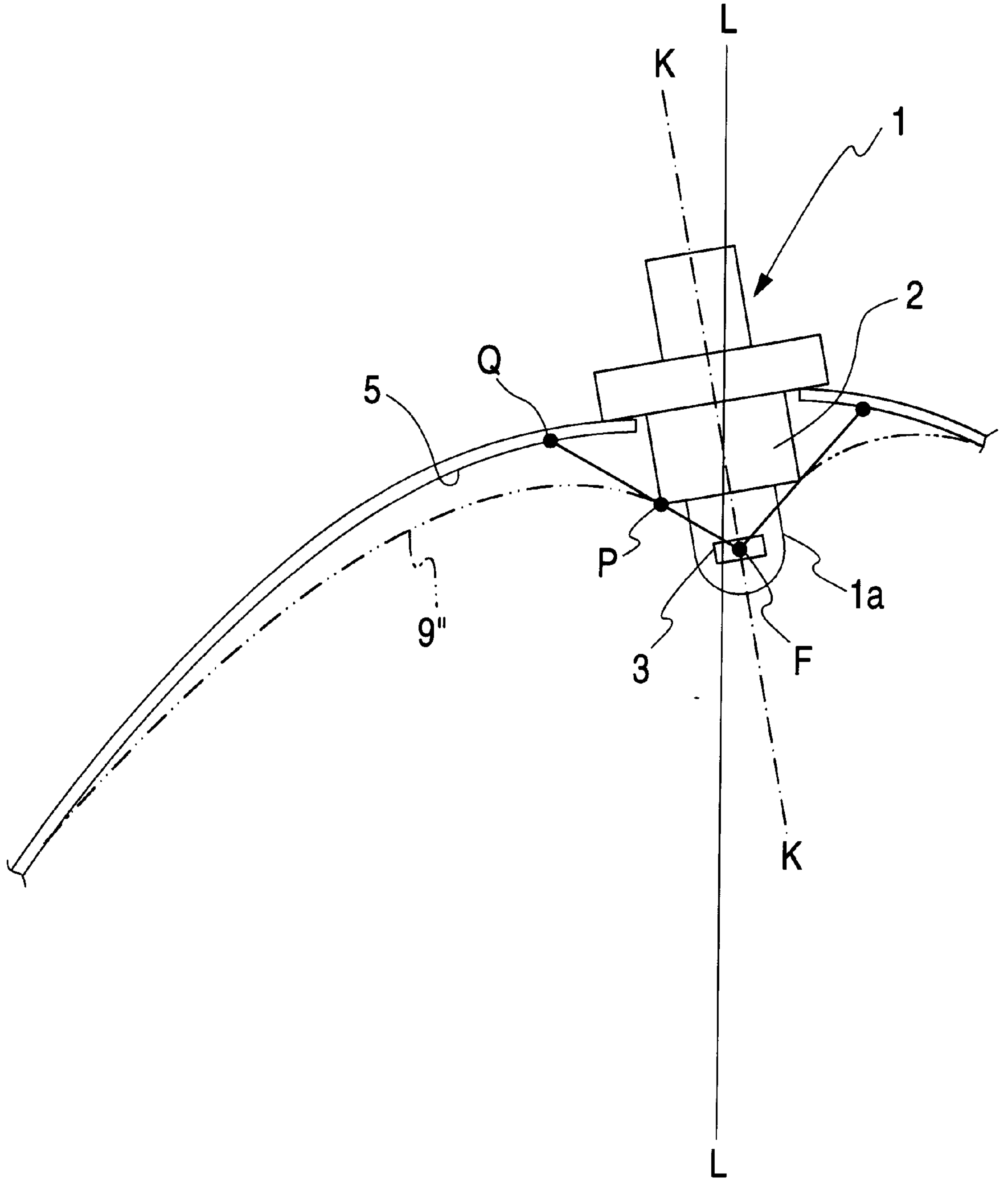
FIG. 10 is a diagram illustrative of the formation of a basic surface when a central axis K—K of a light source is inclined with respect to the optical axis L—L of a reflecting mirror.

Further, it is not required that the reflecting mirror of the invention have the optical axis thereof so as to extend in parallel with the central axis of the light source. Instead, as shown in FIG. 10, the invention may be applied to a case in which the central axis ("K—K") of the light source (the lamp bulb 1 in FIG. 10) is attached to the reflecting mirror so as to be inclined with respect to the optical axis L—L of the reflecting mirror. A basic surface 9", in FIG. 10 can be designed so that there is no area in the surface 9" shaded from the rays of light emitted from the lamp bulb 1.

Figure 11:
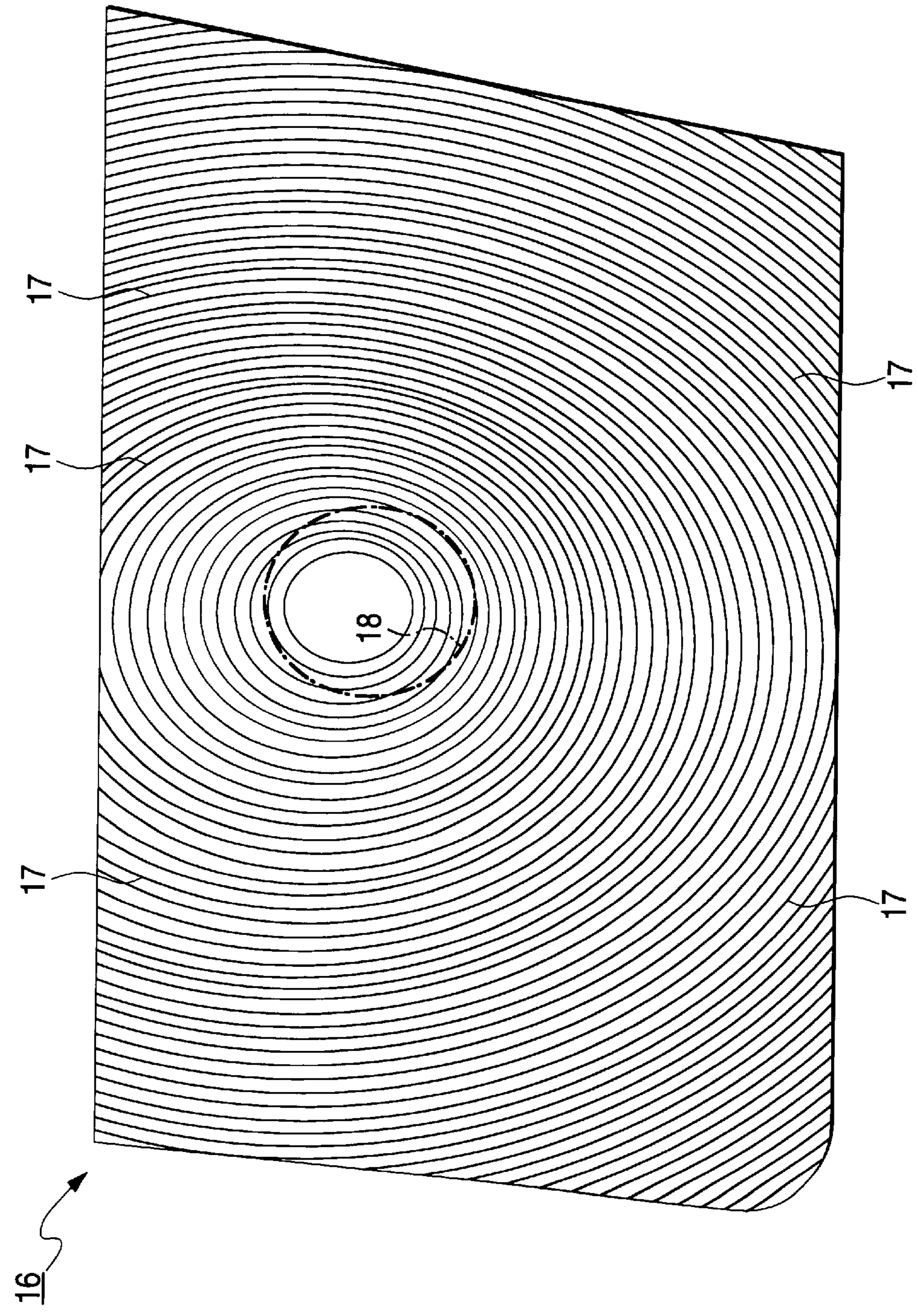
FIG. 11 is a front view of a reflective surface for showing an embodiment of the invention.
Figure 12:
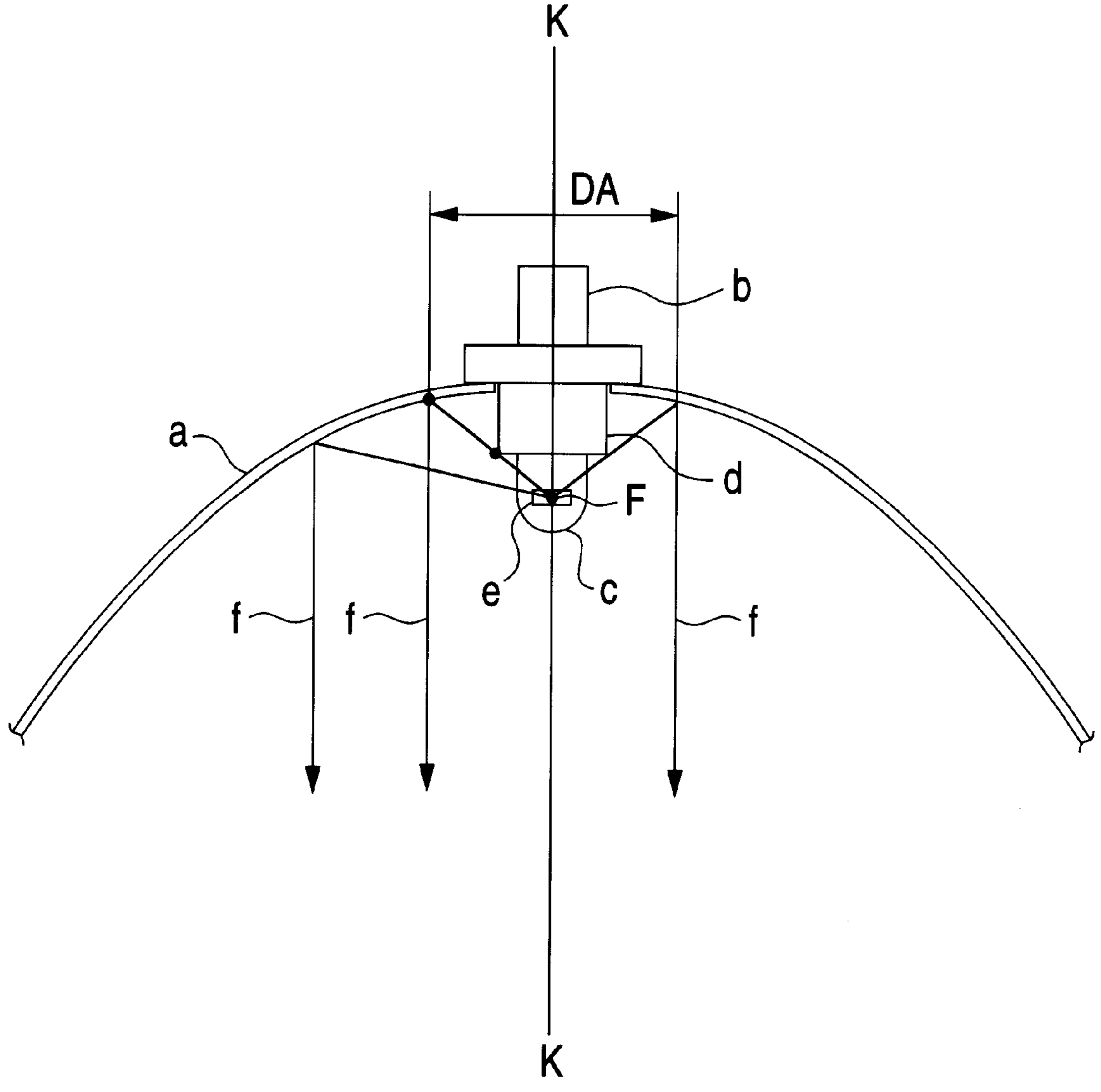
FIG. 12 is a diagram illustrative of problems encountered by a conventional reflecting mirror.

FIG. 11 shows an exemplary shape of the reflective surface prepared by the aforementioned method. FIG. 11 shows an exemplary arrangement of a group of closed curved lines on the curved surface.

As shown in FIG. 11, a reflective surface 16 has a distribution of fingerprint-like patterns obtained by cutting out parts of the group of closed curved lines 17, 17, . . . into a predetermined shape. In the reflective surface 16, the center of the patterns is slightly displaced from the center of an insertion hole 18 of a light source (the position at which the insertion hole 18 is formed is indicated by the one dot chain line in FIG. 11, and this displacement is because the basic surface of the reflective surface does not have symmetry of revolution around the optical axis). While each closed curved line 17 is analogous to an ellipsis in this example, the closed curved lines 17 are generally free curved lines because the shape of the closed curved lines is seldom expressed by means of analytical algebraic expressions.

As is apparent from the foregoing, according to the invention, the rays of light emitted from the light emitting reference point of a light source can reach everywhere on the basic surface of the reflective surface. In addition, by forming the reflecting steps that constitute parts of a group of paraboloids of revolution, rays of light whose reflecting directions are controlled, can be obtained and utilized as rays of light effective in manufacturing luminous intensity distribution. Therefore, the area in the reflective surface which is shaded from the rays of light from the light source can be reduced.

What is claimed is:

1. A vehicle lamp comprising a reflecting mirror having an optical axis and opening in a front direction defined as a direction moving away from said reflecting mirror along said optical axis, a light source being arranged so as to have a positional relationship with respect to said reflecting mirror, and a member or a part of said reflecting mirror being arranged at such a position as to interrupt rays of light emitted from a light emitting reference point set in said light source, said member or said part being positioned closer to said reflection mirror along said optical axis than said light emitting reference point, said reflecting mirror comprising:

a reflective surface defined by a basic surface and having a plurality of reflecting steps;

wherein a partial surface of said basic surface around said member or said part of said reflecting mirror projects in said front direction as compared with a reference surface formed as a set of linear half lines extending from said light emitting reference point as a starting point through an arbitrary point on a front end edge of said member or said part of said reflecting mirror;

wherein said partial surface of said basic surface has such a curved shape as to allow each ray of light emitted from said light emitting reference point to reach respective points on said basic surface; and wherein said plurality of reflecting steps are defined by parts of individual paraboloids of revolution constituting a group of paraboloids of revolution and are disposed on said basic surface between adjacent ones of closed curved lines or curved lines obtained as intersecting lines between said basic surface and said group of paraboloids of revolution, said paraboloids of revolution having focal distances different from each other.

2. The vehicle lamp as recited in claim 1 wherein the light source has a central axis and said optical axis extends in parallel with said central axis of said light source.

3. The vehicle lamp as recited in claim 1 wherein the light source has a central axis and said central axis is inclined with respect to the optical axis of said reflecting mirror.

4. The vehicle lamp as recited in claim 1 wherein the respective focuses of each paraboloid in said group of paraboloids of revolution are at a common point.

5. The vehicle lamp as recited in claim 1 wherein the respective focuses of each paraboloid in said group of paraboloids of revolution are at different points.

6. The vehicle lamp as recited in claim 1 wherein the respective focuses of each paraboloid in said group of paraboloids of revolution are positioned within a predetermined range along the axis of symmetry of revolution.

7. The vehicle lamp as recited in claim 1 wherein said basic surface comprises an original curved surface, said original curved surface comprising a known curved surface.

8. The vehicle lamp as recited in claim 1 wherein said basic surface comprises an original curved surface, said original curved surface is a free curved surface.

9. The vehicle lamp as recited in claim 1 wherein said interrupting member is a bulb socket.

10. The vehicle lamp of claim 1 wherein said basic surface and said partial surface are connected in the form of a nth order continuum.

* * * * *